(12) United States Patent
Kori et al.

(10) Patent No.: US 10,075,112 B2
(45) Date of Patent: Sep. 11, 2018

(54) FIELD WINDING TYPE SYNCHRONOUS MACHINE

(71) Applicant: Hitachi, Ltd., Chiyoda-ku, Tokyo (JP)

(72) Inventors: Daisuke Kori, Tokyo (JP); Motonobu Iizuka, Tokyo (JP); Takayuki Koyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/432,336

(22) Filed: Feb. 14, 2017

(65) Prior Publication Data

US 2017/0250636 A1    Aug. 31, 2017

(30) Foreign Application Priority Data

Feb. 25, 2016    (JP) ................ 2016-033740

(51) Int. Cl.
| H02P 6/32 | (2016.01) |
| H02P 25/03 | (2016.01) |
| H02K 19/12 | (2006.01) |
| H02K 7/116 | (2006.01) |

(52) U.S. Cl.
CPC ............... *H02P 6/32* (2016.02); *H02K 7/116* (2013.01); *H02K 19/12* (2013.01); *H02P 25/03* (2016.02)

(58) Field of Classification Search
USPC ........ 318/89, 700, 400.39, 400.41, 491, 494
See application file for complete search history.

(56) References Cited

U.S. PATENT DOCUMENTS

| 3,555,356 | A | * | 1/1971 | Kaiser | H02H 5/041 318/473 |
| 3,599,236 | A | * | 8/1971 | Hutchins | H02P 25/03 318/718 |
| 3,748,555 | A | * | 7/1973 | Hoffman | H02H 7/0805 318/718 |
| 3,757,182 | A | * | 9/1973 | Chalmers | H02K 19/16 310/210 |
| 3,845,369 | A | * | 10/1974 | Heyne, III | H02P 25/03 318/718 |
| 4,038,589 | A | * | 7/1977 | Heyne | H02P 25/03 318/718 |
| 2015/0035471 | A1 | | 2/2015 | Kori et al. | |

FOREIGN PATENT DOCUMENTS

| JP | 59-117490 A | 7/1984 |
| JP | 6-153475 A | 5/1994 |
| JP | 2015-33150 A | 2/2015 |

* cited by examiner

*Primary Examiner* — Bentsu Ro
(74) *Attorney, Agent, or Firm* — Crowell & Moring LLP

(57) ABSTRACT

A field winding type synchronous machine connects to a DC line and includes a rotor; a stator; an exciter that passes a current through a field winding of the rotor; and a rectification circuit that rectifies an output from the exciter and provides the output to the DC line. The synchronous machine includes the field winding being connected in parallel to a first circuit in which a parallel circuit including a rectifier element and a first switchgear is connected in series to a discharge resistor, a second switchgear being connected in series to the DC line that connects the first circuit to the rectification circuit, and a capacitor being provided between the discharge resistor and the input side of an electric power source element for gating the first switchgear.

10 Claims, 19 Drawing Sheets

FIELD WINDING TYPE SYNCHRONOUS MACHINE

INCORPORATION BY REFERENCE

The present application claims priority from Japanese application JP2016-033740 filed on Feb. 25, 2016, the content of which is hereby incorporated by reference into this application.

BACKGROUND OF THE INVENTION

The invention relates to a field winding type synchronous machine.

A field winding type synchronous machine is a synchronous machine, and some methods for starting it are known. A representative method uses an inverter. However, if a synchronous machine is not required to operate at a variable speed after being synchronously incorporated into an electrical power system, then the inverter will be needed only at start-up, and an initial cost due to the inverter and an expense, such as for installation thereof will become excessive.

In one of the starting methods which do not need an inverter, a direct on line method is used to start a synchronous machine (hereinafter, referred to as "DOL start-up"). This is the same starting method as a full voltage starting method by which an induction motor is started. In this method, although being a synchronous machine, it is started using characteristics of an induction motor only at start-up. At this time, to obtain the characteristics of an induction motor, a field winding on the rotor side is usually excited by a direct current from an AC brushless exciter (AC exciter), but the field winding is disconnected from the AC exciter only at start-up and brought into a short-circuit condition. Also, to reduce a starting current, a discharge resistor (hereinafter, referred to as "DR") is put into the shorted circuit.

However, a DR is needed only at start-up and adversely provides a loss during a stationary operation at a synchronous speed, lowering efficiency of an electric motor. Thus, during a synchronized operation, the DR has to be disconnected. Also, to switch from DOL start-up to the synchronized operation, there is needed a process for switching to a direct current from an AC exciter when started and accelerated to about the synchronous speed.

In a field winding type synchronous machine, various circuits for switching from start-up to a synchronized operation have been studied. For example, a conventional field winding type synchronous machine discloses that a field winding is connected to an AC brushless exciter and a rectification circuit via a thyristor. Also, a DR is disposed in parallel to the field winding. To smooth a DC voltage from the rectification circuit, a smoothing capacitor is disposed in parallel to the rectification circuit.

SUMMARY OF THE INVENTION

FIG. 5 shows a DC voltage waveform from a rectification circuit. As shown in FIG. 5, the DC voltage waveform has a ripple 39 generated at a frequency 6 times higher than an AC exciter frequency because of three phase full wave rectification. A point to be observed in this waveform is a surge voltage 38 that is generated periodically and becomes several times larger than an averaged DC voltage. The surge voltage 38 is generated due to an effect of a reverse recovery current of a diode 11b. To the diode 11b, a forward bias voltage and a reverse bias voltage are applied. The surge voltage is a phenomenon that is generated at this time, and a reverse voltage reduces with time. The surge voltage 38 (L*di/dt) is generated due to a decrease rate of this reverse current (di/dt), by a parasitic inductance in a circuit (L).

In a conventional circuit, to smooth a DC voltage from a rectification circuit, a smoothing capacitor is disposed in parallel to the rectification circuit. The smoothing capacitor is intended to smooth a DC ripple component in a three-phase full wave rectification circuit, and accordingly it is difficult for the smoothing capacitor to correspond to high frequencies, such as the surge. Also, because a gate of a thyristor does not include a dedicated control circuit, an electric power source element or the like to disconnect the circuit, the thyristor is brought into a continuously conducting state. As the result, heat generation of the thyristor becomes problematic. Further, the surge voltage is applied to a zener diode, so that the thyristor may be turned on during a synchronized operation, reconnecting the disconnected DR, as the details will be described below. That is, it is difficult to reduce a starting current and simultaneously secure disconnection of the DR after the synchronized operation.

Therefore, an object of the invention, in a circuit including a DR in a field circuit and for switching to a synchronized operation and disconnecting the DR, is to lower a possibility that the DR may be reconnected after the synchronized operation and to miniaturize the circuit.

To achieve the above object, for example, the inventive field winding type synchronous machine provides a field winding type synchronous machine connecting to a DC line and including a rotor; a stator; an exciter that passes a current through a field winding of the rotor; and a rectification circuit that rectifies an output from the exciter and provides the output to the DC line. The field winding type synchronous machine includes the field winding being connected in parallel to a first circuit in which a parallel circuit including a rectifier element and a first switchgear is connected in series to a discharge resistor, a second switchgear being connected in series to the DC line that connects the first circuit to the rectification circuit, and a capacitor being provided between the discharge resistor and the input side of an electric power source element for gating the first switchgear.

According to the inventive field winding type synchronous machine, in a circuit including a DR in a field circuit and for switching to a synchronized operation and disconnecting the DR, a possibility can be reduced that the DR may be reconnected after the synchronized operation, and the circuit can be miniaturized.

Other objects, features and advantages of the inventive field winding type synchronous machine will become apparent from the following description of the inventive field winding type synchronous machine taken in conjunction with the accompanying drawings.

DESCRIPTION OF THE EMBODIMENTS

Details of the inventive field winding type synchronous machine will be described below with reference to the drawings. In each of the figures, a like part is given a like number.

1. Embodiment 1

Figure 1:
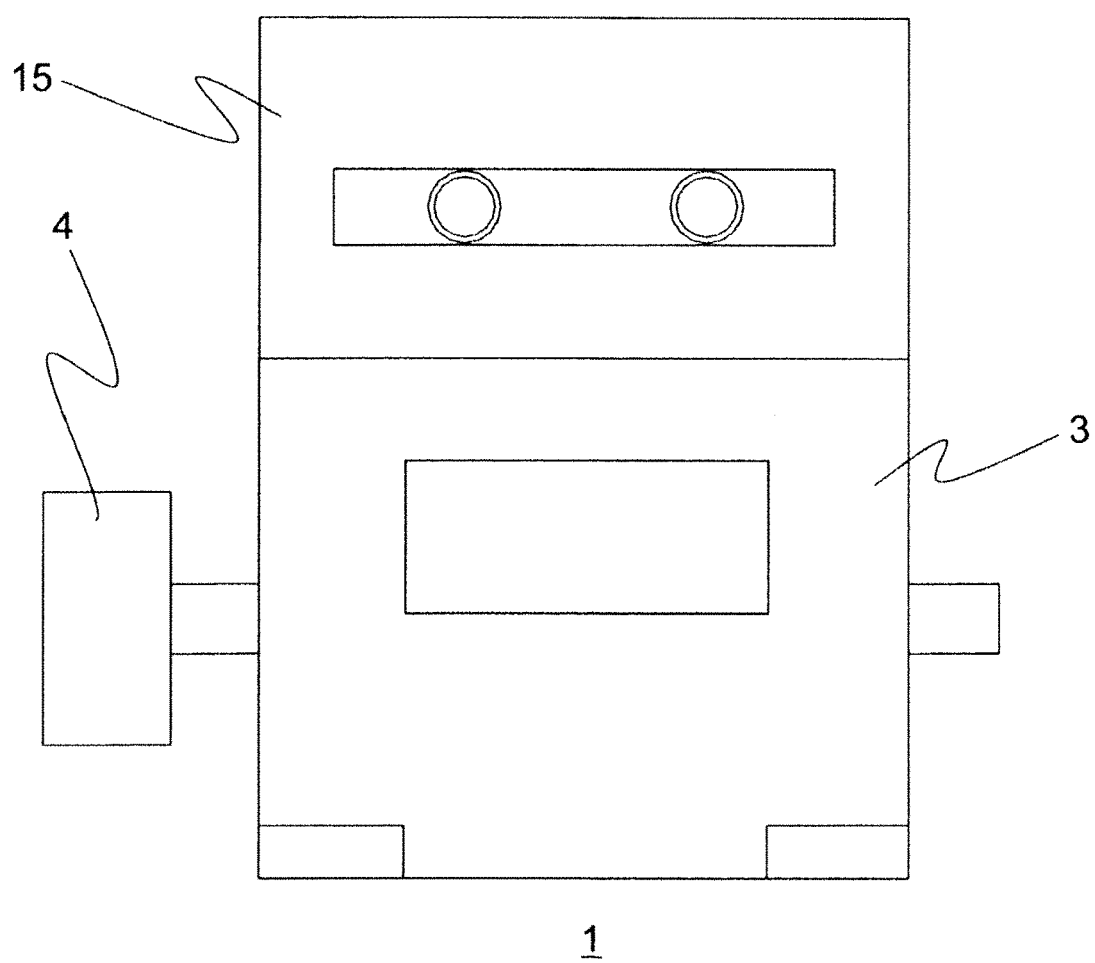
FIG. 1 is an outline view of a field winding type synchronous machine, seen from the side.

FIG. 1 is an outline view of a field winding type synchronous machine, seen from the side.

The field winding type synchronous machine 1 is an electric motor applied, for example, to an LNG plant having tens of MW, in which a driving electric power source is provided by a three-phase AC electric power source and its revolution speed ranges from 750 to 1800 rpm. As shown in FIG. 1, the electric motor includes a rotating machine part 3, a heat exchanger 15 and a brushless AC exciter 4. The rotating machine part 3 has a rotor 8, a stator 5 and a shaft 9 disposed therein, as described below. Although not shown, inside of the rotating machine part 3, a fan may be provided to circulate a cooling air. The brushless AC exciter 4 is electrically connected to the rotating machine part 3, and a field winding 10 of the rotor 8 is energized by a DC current to excite. The heat exchanger 15 is provided on top of the rotating machine part 3 and carries out heat exchange with the cooling air in the rotating machine part 3. In this embodiment, the heat exchanger uses water, but an air may be used.

Figure 2:
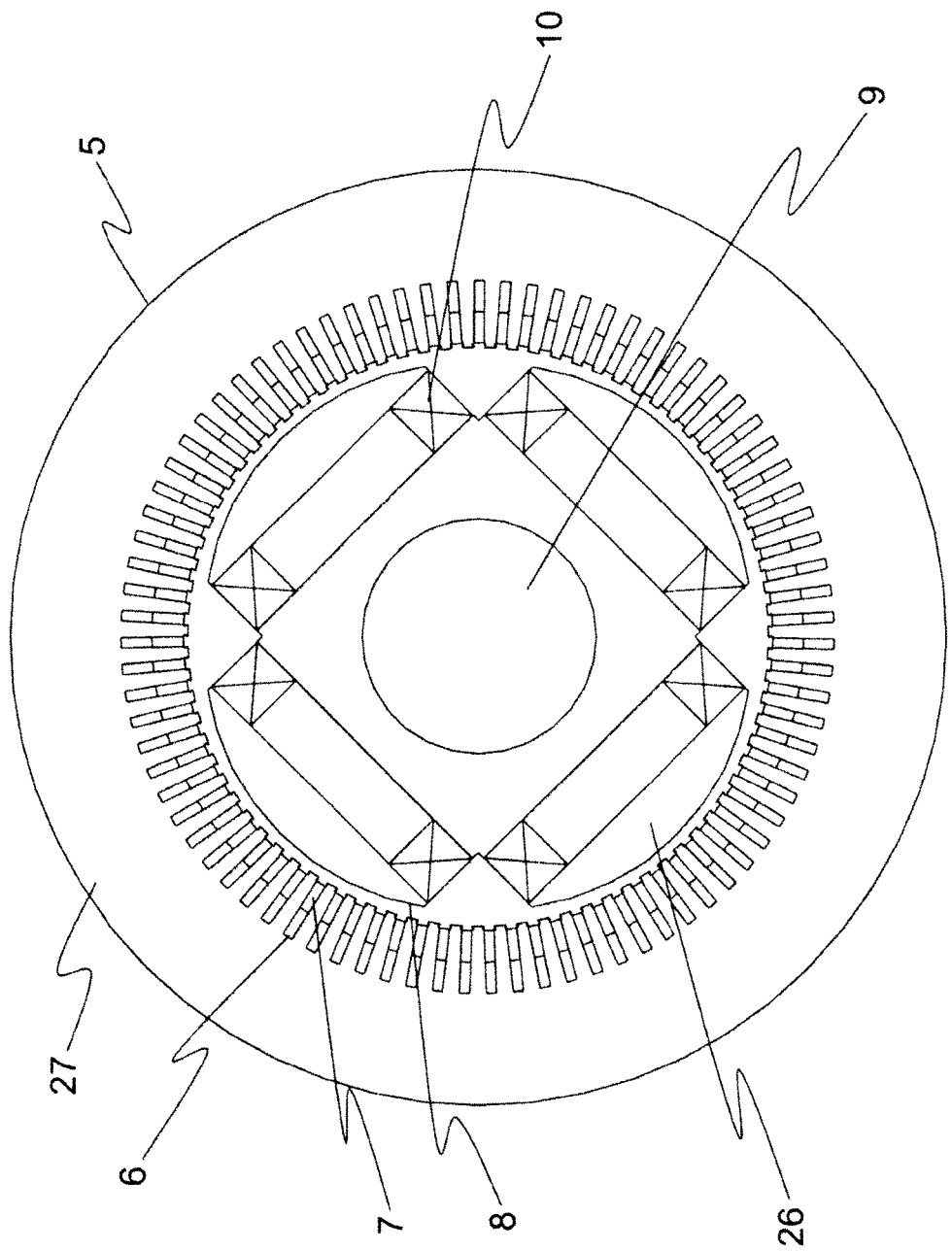
FIG. 2 is a cross-sectional view of a rotor 8 and a stator 5 in a rotating machine part 3.

FIG. 2 is a cross-sectional view of the rotor 8 and the stator 5 in the rotating machine part 3.

The rotor 8 includes a rotor iron core 26, a shaft 9 and the field winding 10. The field winding 10 is disposed by changing the winding direction so that the polarity is alternately changed in a circumferential direction. The rotor iron core 26 is a massive iron core, not formed of a magnetic steel sheet, to obtain a damper effect. This allows a start-up torque to be increased.

The stator 5 is formed by laminating stator iron cores 27 of magnetic steel sheet in an axial direction and a stator slot 6 is provided with a coil 7. In the example in FIG. 2, the number of rotor poles is four and the number of stator slots is 84, but any number of poles or slots may be adopted without problem. Also, a winding method of the coil 7 may be distributed winding or concentrated winding without problem.

Figure 3:
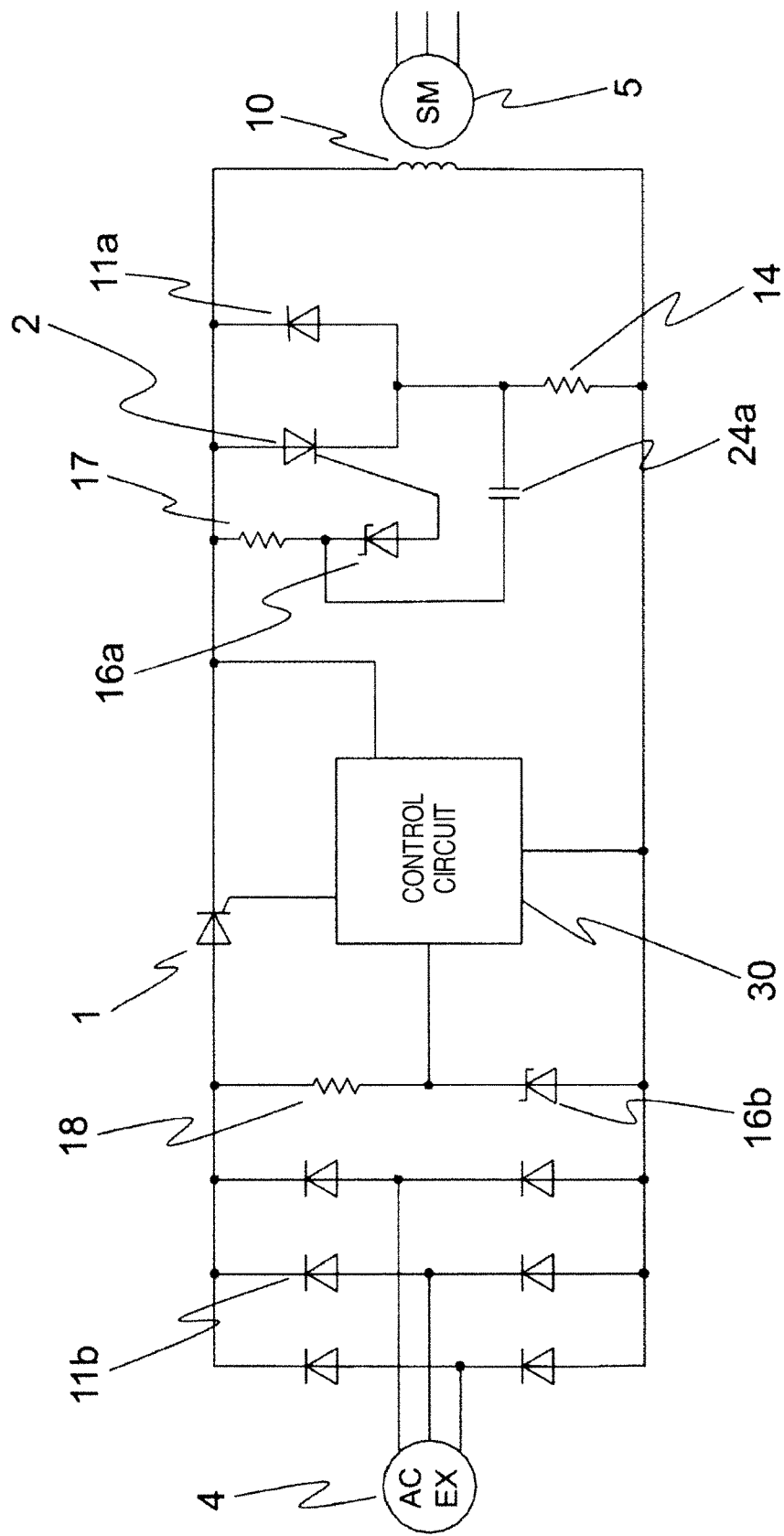
FIG. 3 is a circuit diagram of synchronously applying for the field winding type synchronous machine 1.

FIG. 3 is a circuit diagram of synchronously applying for the field winding type synchronous machine 1. Operation of the circuit will be described below.

First, at start-up of DOL, a thyristor 1 is turned off. Thus, a circuit configuration includes a field coil 10 and a DR 14, a thyristor 2, a resistor 17, a zener diode 16a for controlling a gate signal to the thyristor 2, and diode 11a. Accordingly, seen from the field coil 10, the circuit becomes a shorted circuit via the DR 14, the thyristor 2 and the diode 11a. As the result, an induced electromotive current is generated in the field coil 10 by applying a three-phase voltage to the stator 5 at start-up. On generation of the induced current, a current on the plus side flows to an anode of the thyristor 2 and also to a cathode of the zener diode 16a. When a reverse voltage above a certain threshold is applied to the zener diode 16a, a current flows to a gate of the thyristor 2 due to the breakdown phenomenon. As the result, the thyristor 2 is turned on and the induced current on the plus side flows to the DR 14. On the one hand, the current on the minus side flows to the diode 11a via the DR 14.

Figure 4:
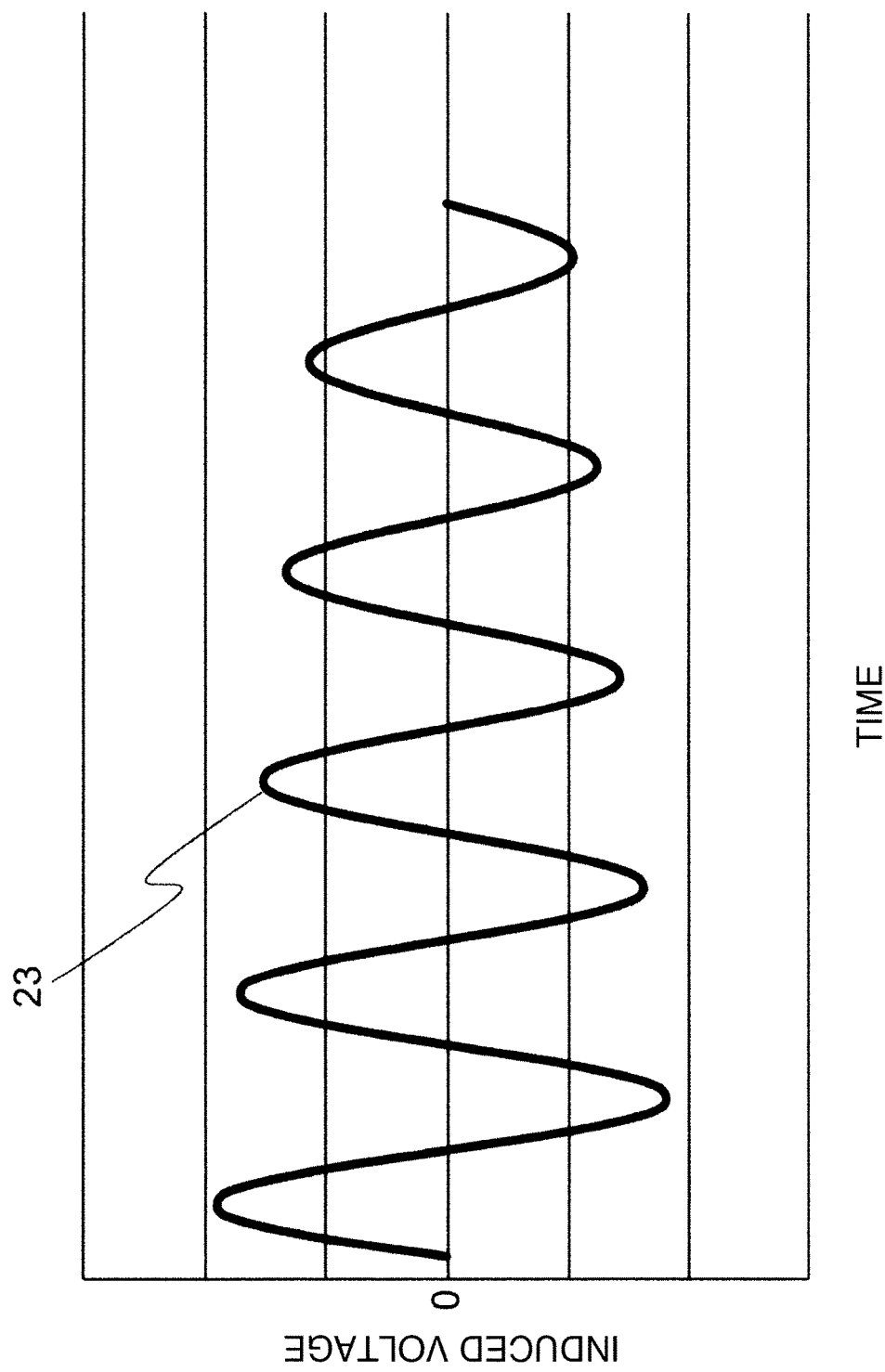
FIG. 4 shows change in induced voltage 23 according to a synchronized operation from start-up.

Here, the reverse voltage above a certain threshold is an induced voltage 23, and FIG. 4 shows change in the induced voltage 23 according to a synchronized operation from start-up. As shown in FIG. 4, at start-up, the voltage has a large amplitude and also a high frequency. This is the same state as a large slip of an induction motor. Meanwhile, as the speed is accelerated to a synchronous speed (rated speed), both the amplitude and the frequency of the voltage are attenuated.

Next, returning to FIG. 3, during a synchronized operation, the DR 14 becomes unnecessary, so that it has to be disconnected from the circuit. Accordingly, if voltage characteristics of the zener diode 16a are selected to match the induced voltage 23, then the thyristor 2 can be turned off at about a synchronous speed, thereby disconnecting the current on the plus side. In this way, the induced electromotive current flows to the DR 14 from the start-up to about the synchronous speed, and when reaching about the synchronous speed, only the induced electromotive current on the minus side flows to the DR 14.

Here, the reason that the thyristor 2 and the diode 11a are connected in series to the DR 14 is that field-on by the AC exciter is performed using a DC current, so that if the thyristor 2 is turned off, the current does not flow to the DR 14. Further, the current is reverse to the diode 11a, so that the direct current is blocked. As the result, the direct current can be prevented from flowing to the DR 14, the DR 14 can be disconnected after the field-on, and by providing the DR 14, a starting current at start-up can be decreased.

Next, operation for acceleration to the synchronous speed and the field-on by the AC exciter will be described. The principle of the AC exciter 4 is identical with that of an AC exciting synchronous generator and a current is generated in a rotor by passing an exciting current through a stator. This allows a current to be supplied to the field coil without the brush. Accordingly, a generated current increases as an electric motor is accelerated. The three-phase alternating current flows from the AC exciter 4 and is converted into a direct current in a rectification circuit including 6 diodes 11b. Because the thyristor 1 is turned off at start-up, the direct current is not energized to the field winding 10. To energize the field winding 10, a control circuit 30 transmits a signal to a gate of the thyristor 1 and the thyristor 1 is turned on, thereby passing the direct current through the field winding 10. For turning the thyristor 1 on, it is preferable to turn the thyristor 1 on at about the synchronous speed because of features of the start-up characteristics, as described above. Thus, by connecting the control circuit 30 to the cathode side of the thyristor 1, the induced voltage at start-up can be received in the control circuit 30 as an input signal. As the result, the condition that the thyristor 1 be turned on can be set. As for this condition, its details will be described after a second embodiment. Also, a driving electric power source for the control circuit 30 is supplied to the control circuit 30 via a constant-voltage circuit including a resistor 18 and a zener diode 16b on the anode side of the thyristor 1. When the thyristor 1 is turned on, the direct current flows to excite the field winding 10, driving the electric motor as a usual synchronous machine.

Figure 5:
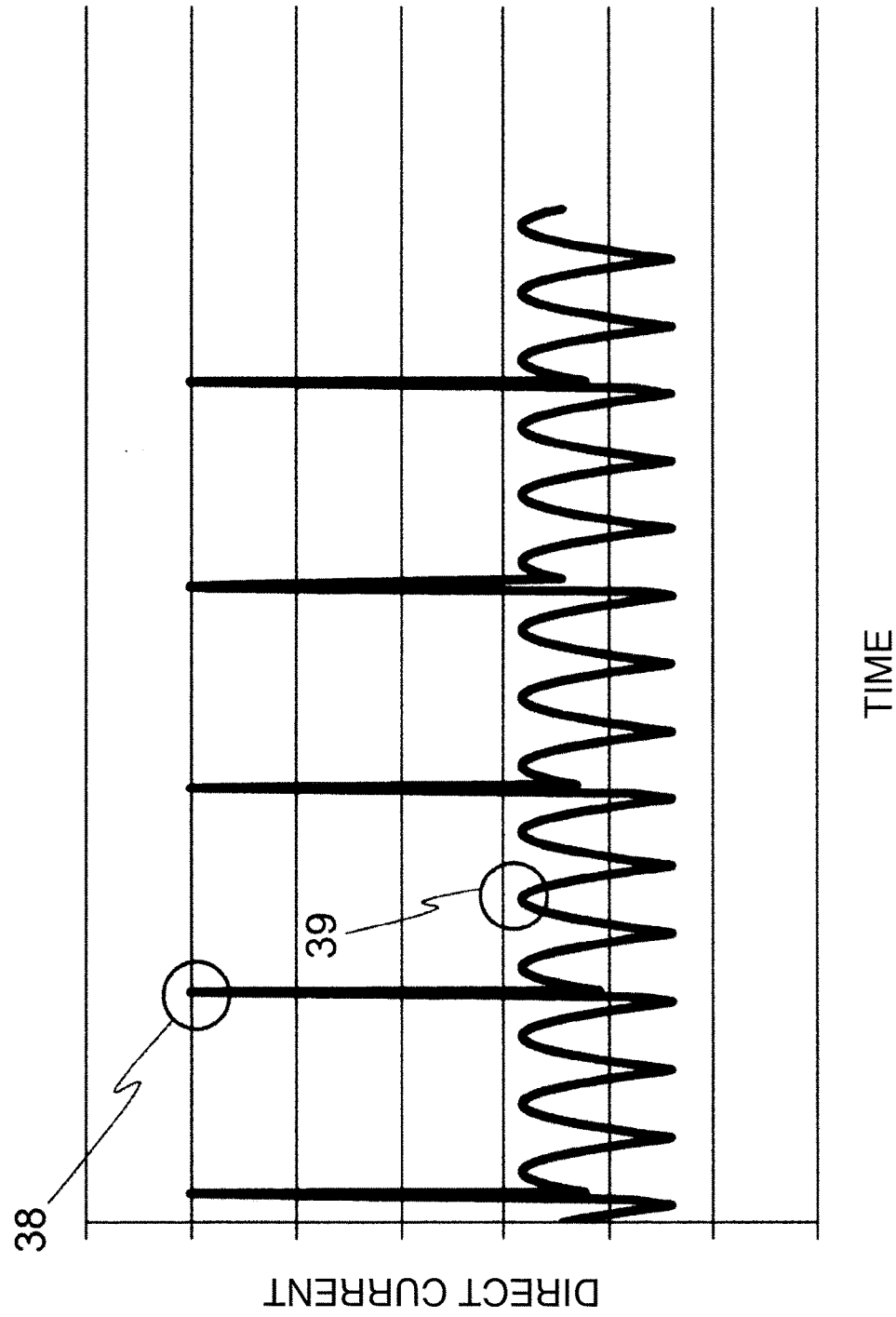
FIG. 5 shows a DC voltage waveform from a rectification circuit.

As described in FIG. 5 above, the surge voltage 38 is generated in this direct current and the surge voltage 38 is also applied to the zener diode 16a, so that it is possible that the surge voltage 38 may exceed the breakdown voltage of the zener diode 16a, the thyristor 2 may be turned on, reconnecting the disconnected DR 14. To resolve this problem, a capacitor 24a was disposed between the cathode side of the zener diode 16a and the DR 14. This capacitor 24a has a function of low pass filter and the surge voltage 38 is also applied to the zener diode 16a, thereby the thyristor 2 can be prevented from being turned on again. Here, because the surge has a frequency even higher than a DC ripple (a component 6 times higher than the frequency), it is preferable to set capacitance of the capacitor to match the frequency of the AC exciter. Further, also against a sudden signal, such as a noise, the low pass filter (generally, a noise has high frequencies) allows the thyristor 2 to be held in the turn-off state and the DR 14 to be disconnected. Also, as the capacitor, a film capacitor is preferable to an aluminum electrolysis capacitor on which the aging has a large effect. In the inventive field winding type synchronous machine, the problem can be solved only by applying the diode to the rectification circuit and adding the capacitor 24a. With the exception of the stator 5 in the circuit shown in FIG. 3, other components are configured to be attached to the shaft 9 of the rotor 8, so that the circuit rotates together when the electric motor runs.

Also, in this embodiment, the thyristors 1 and 2 are used, but other semiconductor elements having a function of gating may be used. Further, a mechanical switchgear may be used, and in this case, the advantage described above can be also achieved by a configuration in which the circuit part to be attached to the shaft 9 is removed therefrom and installed differently, and a brush is provided. Furthermore, the AC exciter may be a DC exciter.

2. Embodiment 2

Figure 6:
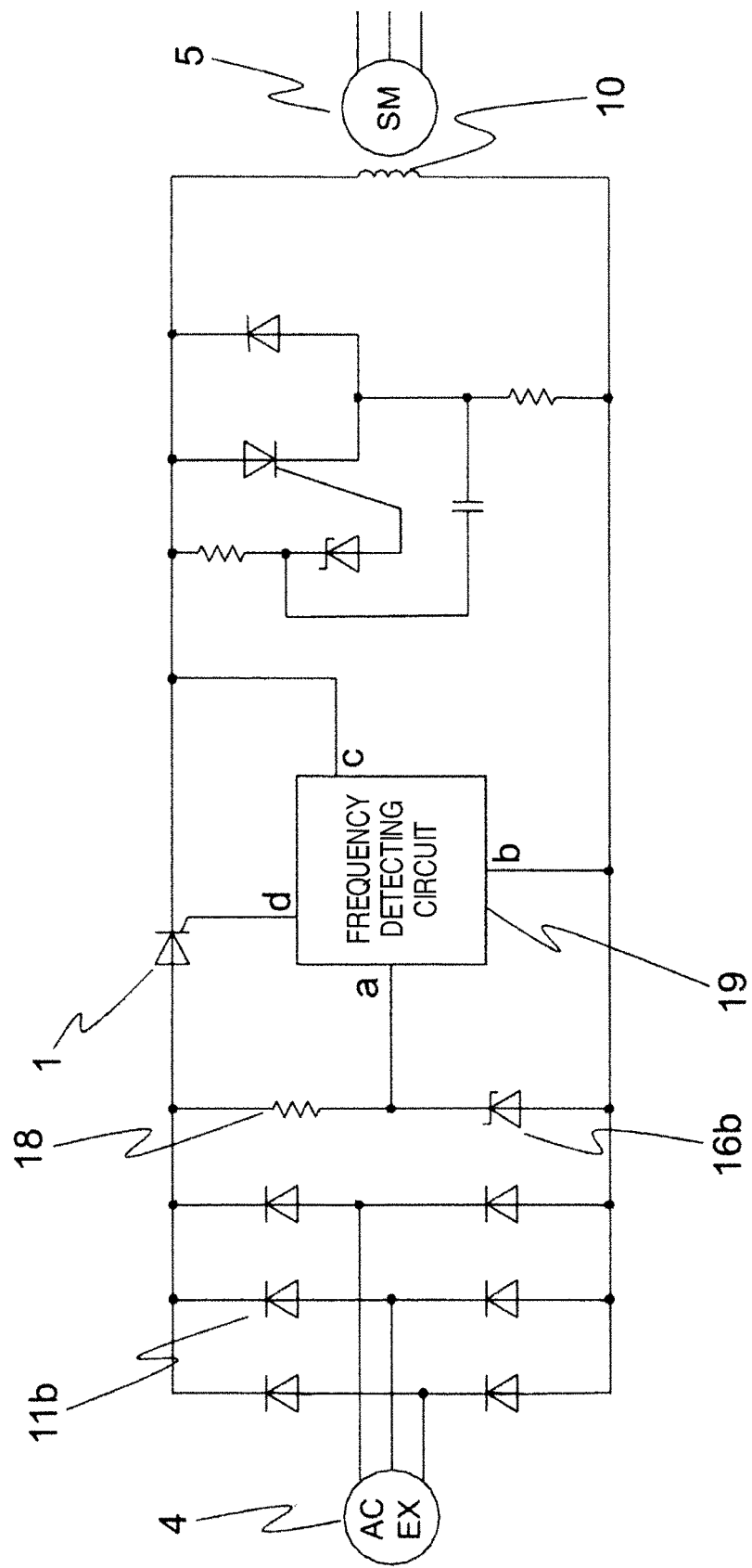
FIG. 6 is a circuit diagram of a frequency detecting circuit 19 provided in a control circuit 30.

FIG. 6 is a circuit diagram of a frequency detecting circuit 19 provided in the control circuit 30.

As described above in FIG. 4, as the characteristics of the induced voltage at start-up, when the revolution speed is low, the difference from the frequency of the electric power source supplied to the stator 5 is large, so that the induced voltage generated in the field coil 10 is large and its frequency is high. This frequency is called a slip frequency, and as the revolution speed becomes high, the induced voltage and the slip frequency are lowered. When the frequency detecting circuit 19 provided in this embodiment detects a preset frequency, i.e. the slip frequency, the frequency detecting circuit transmits a signal to the gate of the thyristor 1, allowing the field-on.

In the frequency detecting circuit 19, input/output parts "a" to "d" are provided, and a value of the direct current output from the thyristor 1 is input to the input/output part "c". The input/output part "a" is an input part of the device for power from the electric power source. The input/output part "b" provides the ground for the input and the electric power source in common. The input/output part "d" is an output part and passes a current through the gate of the thyristor 1.

Figure 7:
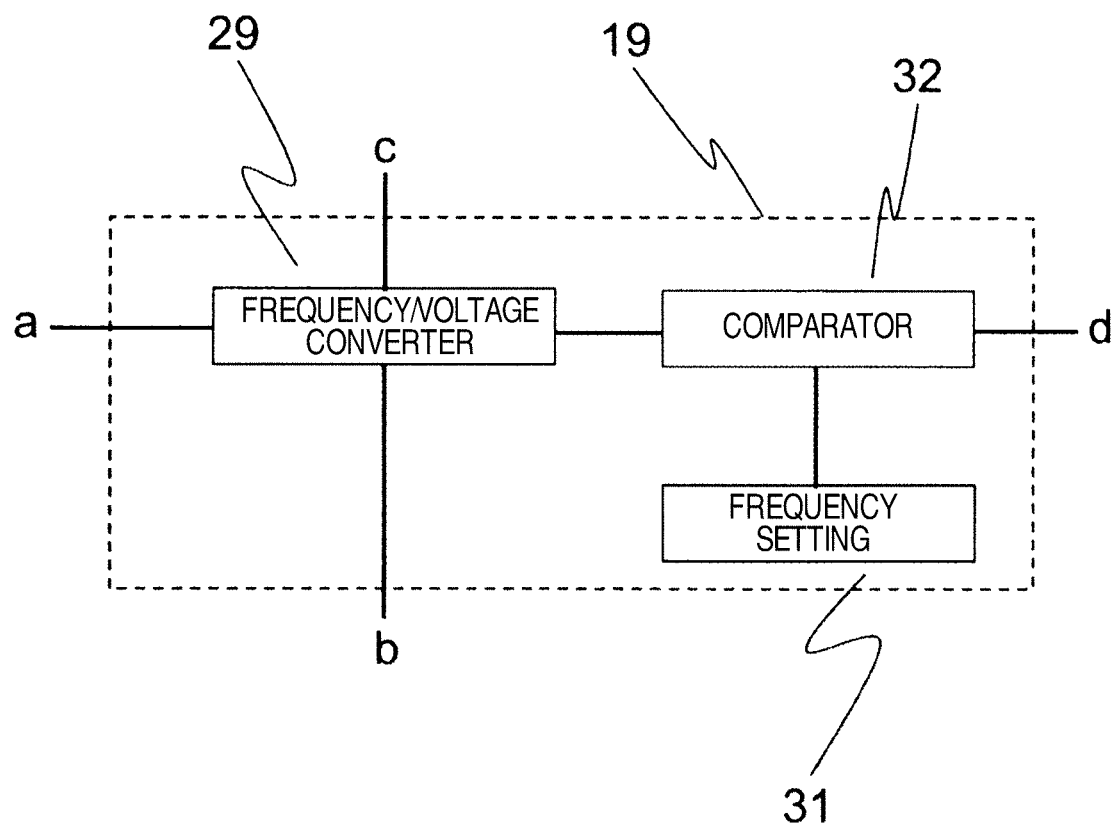
FIG. 7 shows an internal configuration of the frequency detecting circuit 19.

FIG. 7 shows an internal configuration of the frequency detecting circuit 19. As shown in FIG. 7, the frequency detecting circuit 19 includes a frequency/voltage converter 29, a comparator 32 and a frequency setting part 31. An electric power source for the frequency detecting circuit 19 is provided via the input/output part "a" by a constant-voltage circuit in which the output from the AC exciter 4 is converted into a direct voltage via the diode 11b and into a constant voltage via the resistor 18 and the zener diode 16b. The frequency/voltage converter 29 converts the frequency into a voltage. Subsequently, the slip frequency of the induced voltage and the frequency set by the frequency setting part 31 are compared to each other by the comparator 32, and when they are equal, a signal is transmitted to the thyristor 1. The electric motor differs in acceleration state, depending on a load condition at start-up, and accordingly, the slip frequency also varies. Thus, by taking the load condition into consideration and setting a suitable slip frequency, the field-on allows a stable start-up characteristic to be obtained.

3. Embodiment 3

Figure 8:
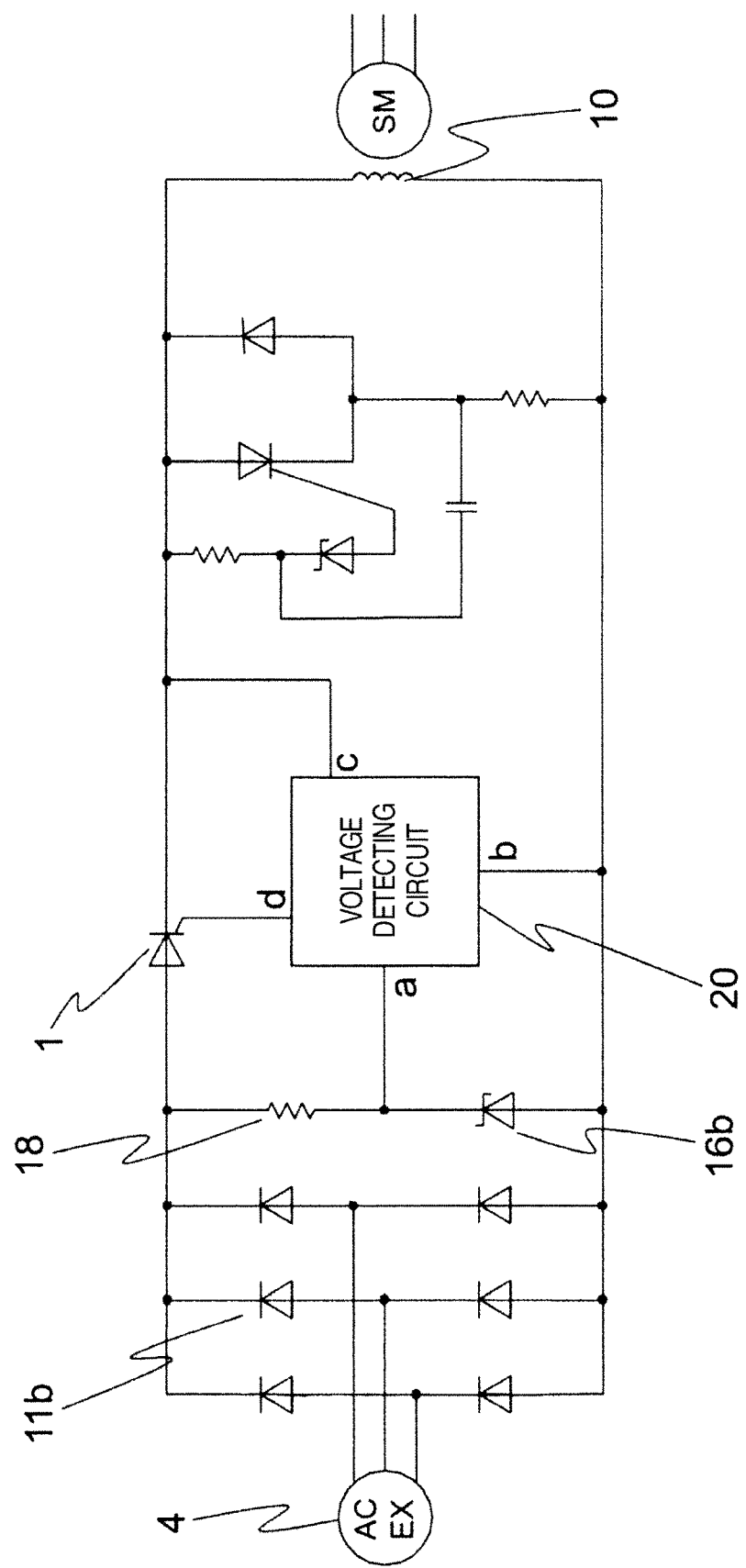
FIG. 8 is a circuit diagram of a voltage detecting circuit provided in the control circuit 30.

FIG. 8 is a circuit diagram of a voltage detecting circuit provided in the control circuit 30.

As described in FIG. 4 of the first embodiment, a strength of the induced voltage varies as a function of the revolution speed. As shown in FIG. 8, the strength of the induced voltage is detected by the voltage detecting circuit 20, and when the detected voltage reaches the preset voltage, a signal is transmitted to the gate of the thyristor 1, allowing the field-on. An input to the voltage detecting circuit 20 is indicated by "c" in FIG. 8, and the electric power source for the device is indicated by "a", and the ground for the input and the electric power source is in common indicated by "b". An output is indicated by "d" and its current flows to the gate of the thyristor 1.

Figure 9:
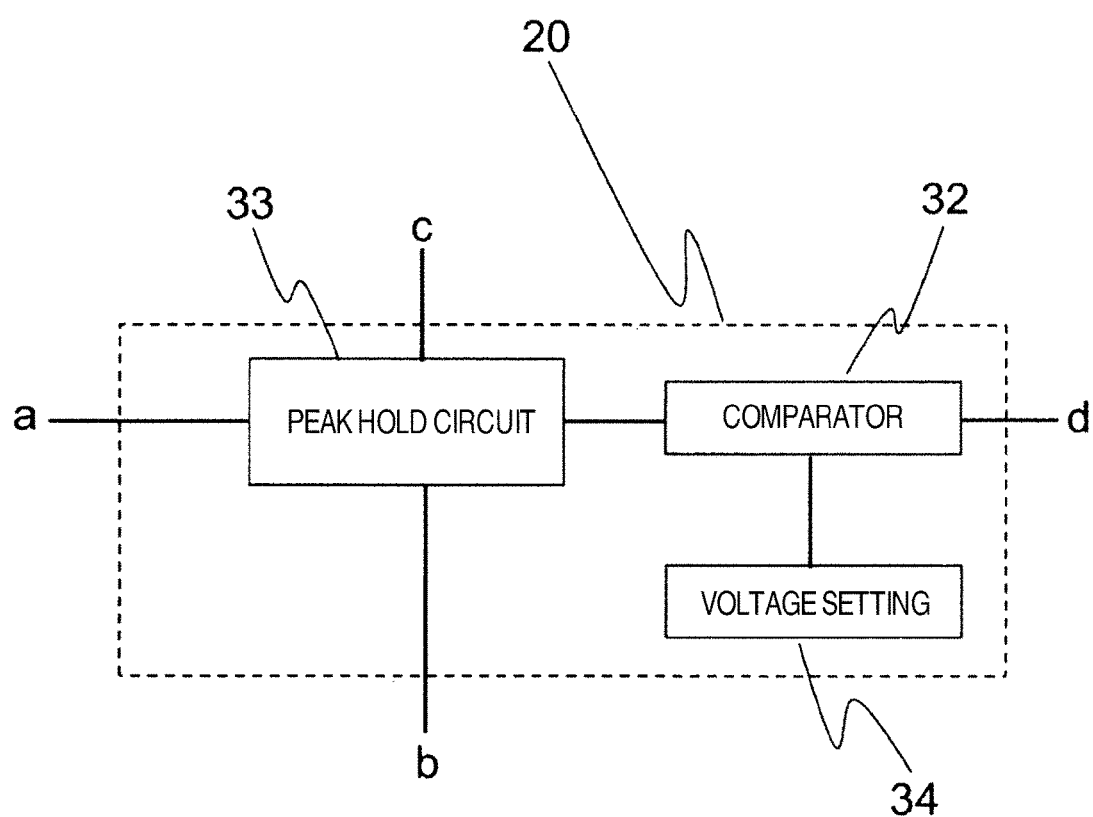
FIG. 9 shows an internal configuration of the voltage detecting circuit 20.

FIG. 9 shows an internal configuration of the voltage detecting circuit 20. The voltage detecting circuit 20 includes a peak hold circuit 33, a comparator 32 and a voltage setting part 34. In the voltage detecting circuit 20, the peak hold circuit 33 detects the maximum value of the input induced voltage. An electric power source for the peak hold circuit 33 is provided by a constant-voltage circuit where the output from the AC exciter 4 is converted into a direct current via the diode 11b and into a constant voltage via the resistor 18 and the zener diode 16b. A voltage value of the induced voltage and a voltage set by the voltage setting part 34 are compared to each other by the comparator 32, and when they are equal, a signal is transmitted to the thyristor 1. The electric motor differs in acceleration state, depending on a load condition at start-up, and accordingly the induced voltage varies. By taking the load condition into consideration and setting a suitable voltage, the field-on allows a stable, start-up characteristic.

4. Embodiment 4

Figure 10:
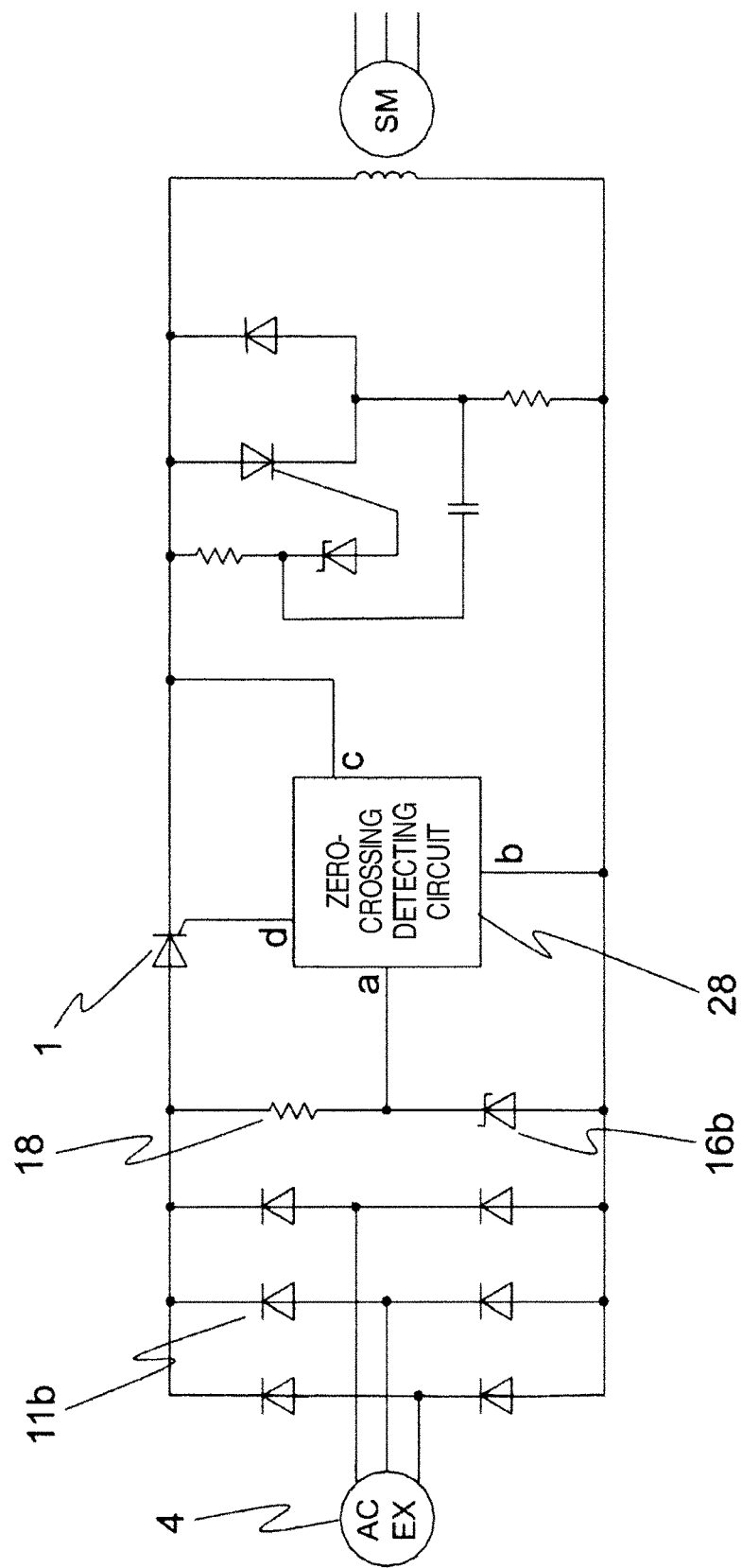
FIG. 10 is a circuit diagram of a zero-crossing detecting circuit provided in the control circuit 30.

FIG. 10 is a circuit diagram of a zero-crossing detecting circuit provided in the control circuit 30. As shown in FIG. 10, the zero-crossing detecting circuit 22 detects a zero-crossing point of the induced voltage, and at the time of the zero-crossing, a signal is transmitted to the gate of the thyristor 1, allowing the field-on. An input to the zero-crossing detecting circuit 22 is indicated by "c" in FIG. 10, an electric power source of the device is by "a" and the ground for the input and the electric power source is by "b" in common. The output is indicated by "d" and its current flows to the gate of the thyristor 1.

Figure 11:
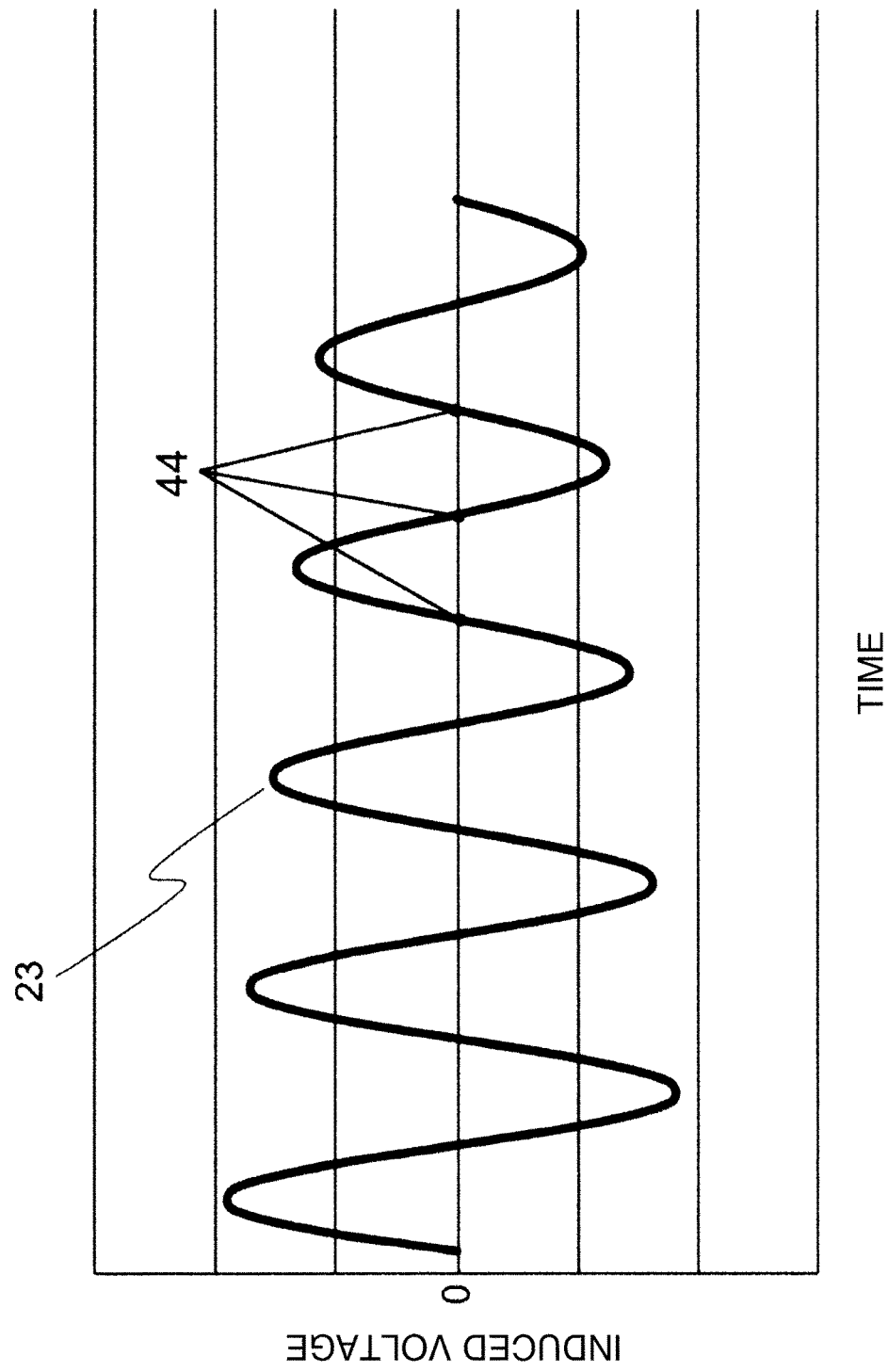
FIG. 11 shows a zero-crossing point 44 of the induced voltage.

FIG. 11 shows the zero-crossing points 44 of the induced voltage. As shown in FIG. 11, the zero-crossing points 44 are detected by finding the point at which the polarity of the induced voltage changes. A driving electric power source for the zero-crossing detecting circuit 22 is provided by the constant-voltage circuit where the output from the AC exciter 4 is converted into a direct current via the diode 11$b$ and into a constant voltage via the resistor 18 and the zener diode 16$b$. As the result, a phase at the field-on can be always applied at the same timing, so that, each time, the same start-up characteristic can be achieved.

5. Embodiment 5

Figure 12:
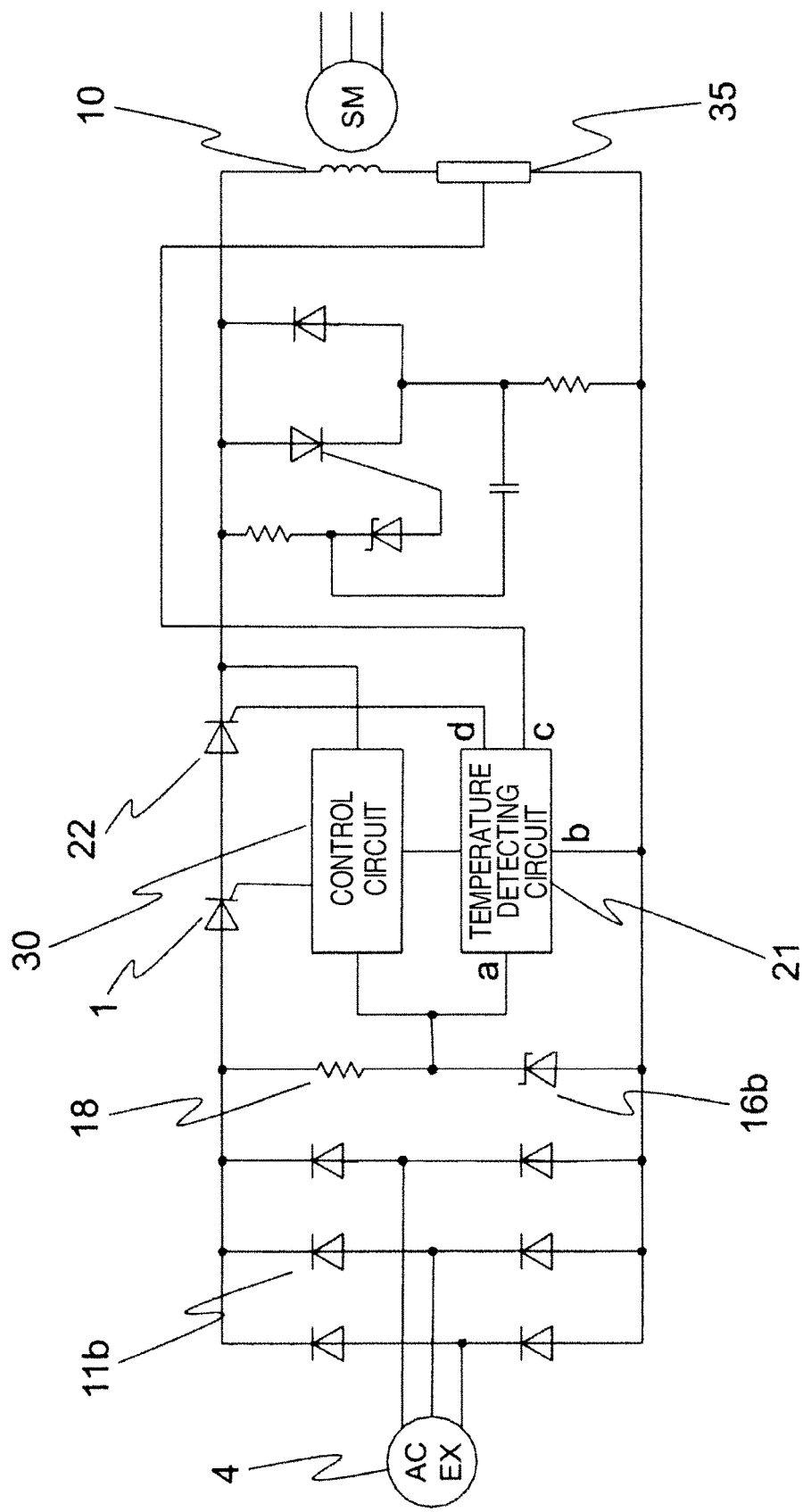
FIG. 12 is a circuit diagram when a temperature sensor is provided.

FIG. 12 is a circuit diagram when a temperature sensor is provided.

As shown in FIG. 12, the temperature sensor 35 is attached to the field coil 10. A signal from the temperature sensor 35 is input to a temperature detecting circuit 21, and when above the preset temperature, a switchgear 22 is turned off. An input to the temperature detecting circuit 21 is the signal from the temperature sensor 35, which is input to the point indicated by "c". An electric power source of the temperature detecting circuit 21 is indicated by "a", the ground for the input and the electric power source is indicated by "b" in common. The output is indicated by "d" and its current flows to the gate of the switchgear 22.

Figure 13:
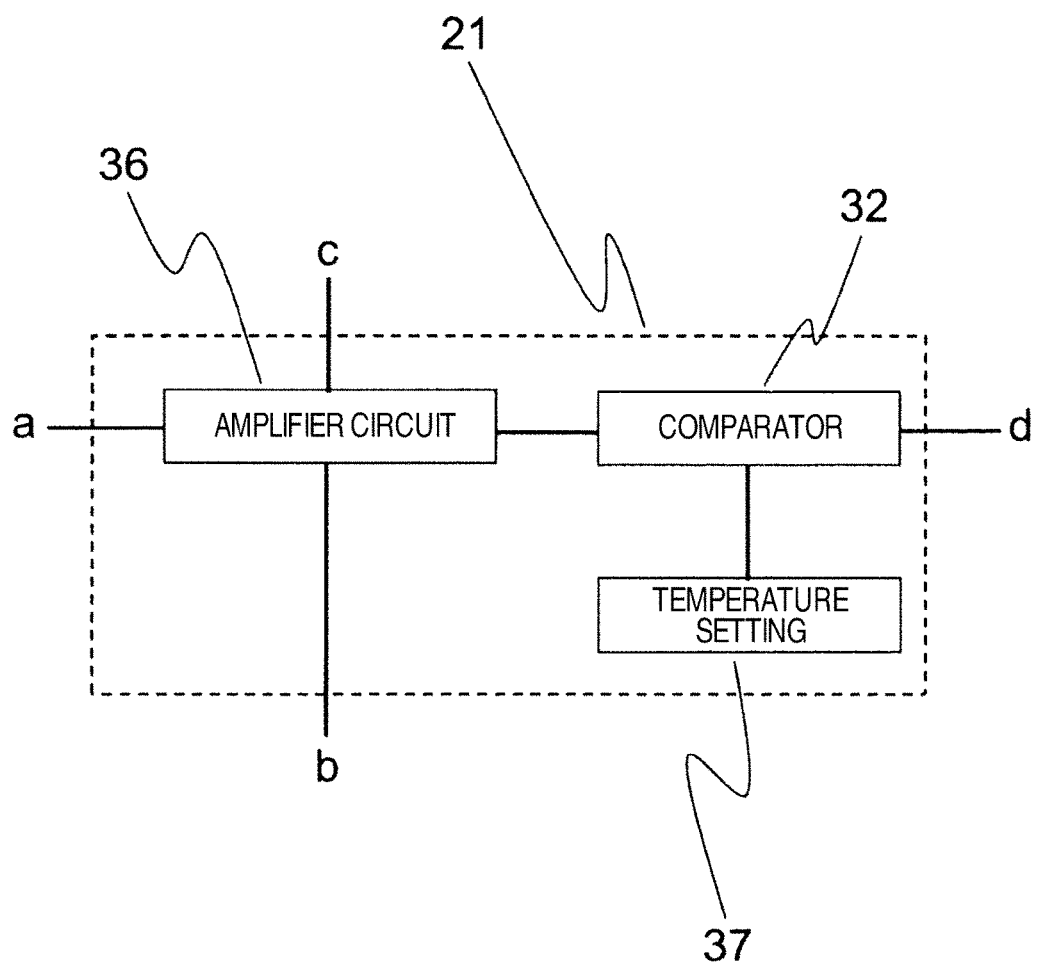
FIG. 13 shows an internal configuration of a temperature detecting circuit 21.

FIG. 13 shows an internal configuration of the temperature detecting circuit 21. The temperature detecting circuit 21 includes an amplifier circuit 36, a comparator 32 and a temperature setting part 37. The signal from the temperature sensor 35 is amplified by the amplifier circuit 36. A driving electric power source for the amplifier circuit 36 is provided by a constant-voltage circuit where the output from the AC exciter 4 is converted into a DC voltage via the diode 11$b$ and into a constant voltage via the resistor 18 and the zener diode 16$b$. The comparator 32 compares a voltage which is input from the temperature sensor 35 and amplified by the amplifier circuit 36 with a voltage set by the temperature setting part 37, and when they are equal, a signal is transmitted to the switchgear 22. According to this embodiment, when the temperature of the field coil 10 reaches a temperature upper value of the adopted coil, a thyristor 22 is turned off and the electric motor will return from the synchronized operation state to the DOL state. When returning to the DOL state and the slip frequency is low, then the induced electromotive current becomes lower than the field current, so that overheat of the field coil 10 can be avoided. On the one hand, when returning to the DOL state and the slip frequency is high, then the revolution speed itself lowers, so that an abnormal state of the machine itself can be detected. Note that the switchgear 22 can include a semiconductor element (IGBT, GTO or the like) in which presence or absence of the gate signal allows switching between turn-on and turn-off. Also, a mechanical switchgear can provide a similar function. The control circuit shown in FIG. 12 is the frequency detecting circuit and the voltage detecting circuit shown in the embodiments 2 and 3. Note that the ground is common to the control circuit 30 and the temperature detecting circuit 21, and both circuits are connected to each other in FIG. 12.

6. Embodiment 6

Figure 14:
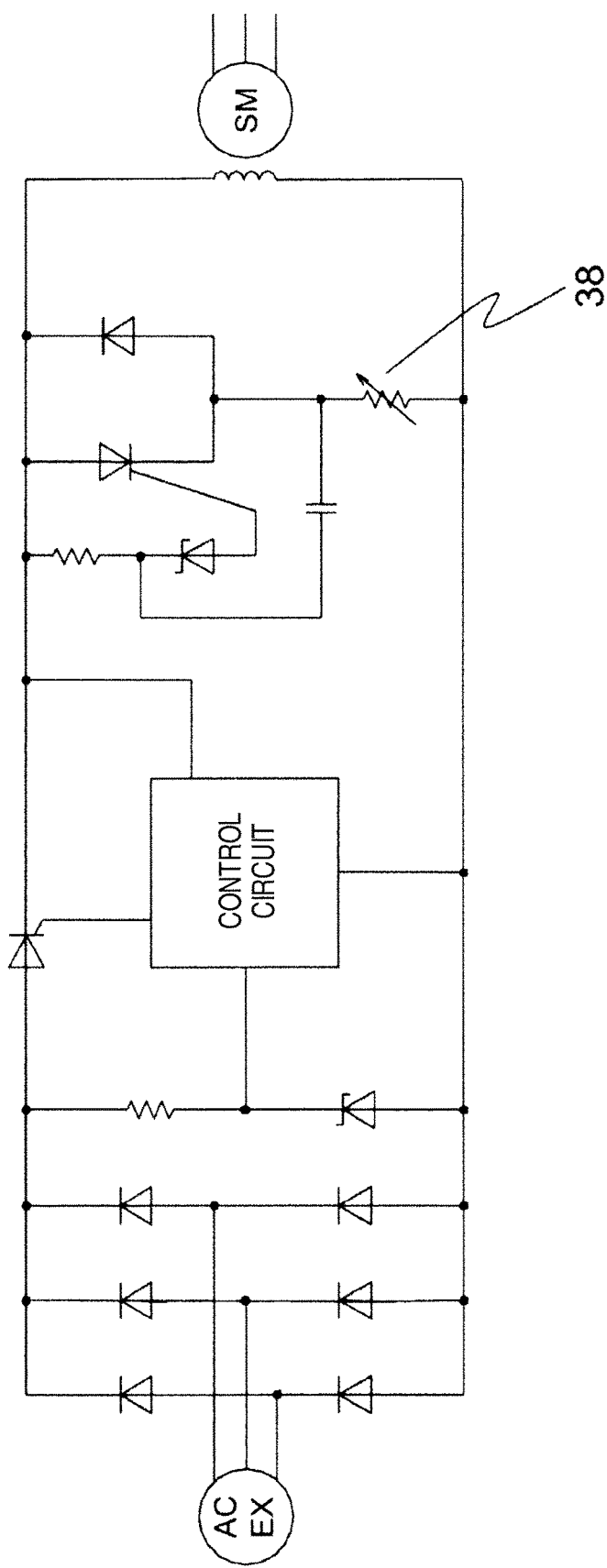
FIG. 14 is a circuit diagram when a DR is a variable resistor.

FIG. 14 is a circuit diagram when a DR is a variable resistor. The DR being a variable resistor 38 allows an optimal resistor value to be set even if a nature of the electric motor (output, frequency) changes. Optimizing the resistor value of the DR will minimize the starting current.

7. Embodiment 7

Figure 15:
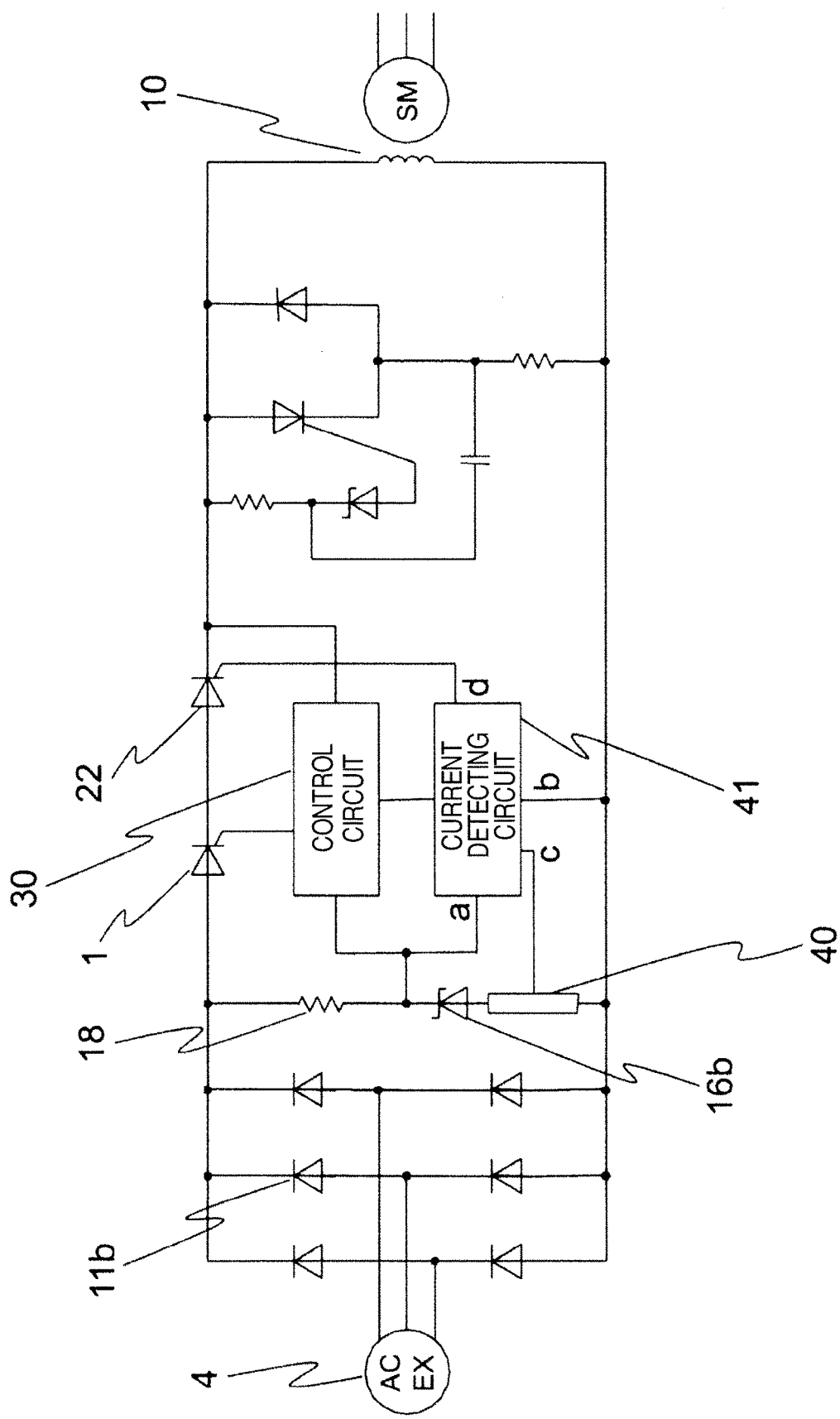
FIG. 15 is a circuit diagram when a current sensor is provided.

FIG. 15 is a circuit diagram when a current sensor is provided.

As shown in FIG. 15, the current sensor 40 is attached to the anode side of the zener diode 16$b$. A signal from the current sensor 40 is input to a current detecting circuit 41, and when above the preset current, the switchgear 22 is turned off. An input to the current detecting circuit 41 is the signal from the current sensor 40 and input to the point indicated by "c". An electric power source of the current detecting circuit 41 is indicated by "a", the ground for the input and the electric power source is indicated by "b" in common. The output is indicated by "d" and its current flows to the gate of the switchgear 22.

Figure 16:
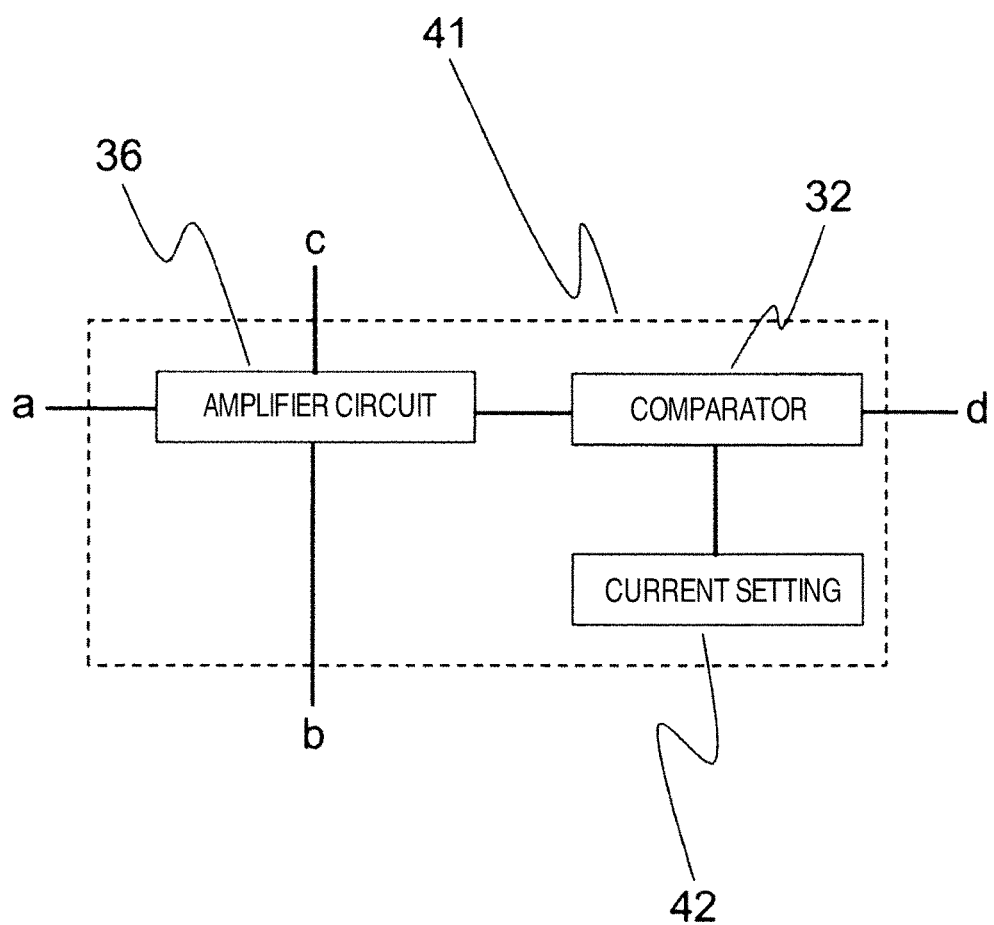
FIG. 16 shows an internal configuration of a current detecting circuit 41.

FIG. 16 shows an internal configuration of the current detecting circuit 41. The current detecting circuit 41 includes an amplifier circuit 36, a comparator 32 and a current setting part 42. The signal from the current sensor 40 is amplified by the amplifier circuit 36. A driving electric power source for the amplifier circuit 36 is provided by the constant-voltage circuit where the output from the AC exciter 4 is converted into a direct current via the diode 11$b$ and into a constant voltage via the resistor 18 and the zener diode 16$b$. The comparator 32 compares a signal which is input from the current sensor 40 and amplified by the amplifier circuit 36 with a signal set by the current setting part 42, and when they are equal, a signal is transmitted to the switchgear 22. According to this embodiment, when the current of the AC exciter becomes an overcurrent state, a thyristor 22 is turned off and the electric motor will return from the synchronized operation state to the DOL state. When returning to the DOL state and the slip frequency is low, then the induced electromotive current becomes lower than the field current, so that overheat of the field coil 10 can be avoided. On the one hand, when returning to the DOL state and the slip frequency is high, then the revolution speed itself lowers, so that an abnormal state of the electric motor itself can be detected. Also, the current of the anode side of the zener diode 16$b$ is detected and the current is lower than the field current, so that the physical size of the current sensor 40 can be made small and compact. Note that the switchgear 22 can include a semiconductor element (IGBT, GTO or the like) in which presence or absence of the gate signal allows switching between turn-on and turn-off. The control circuit 30 shown in FIG. 15 is the frequency detecting circuit and the voltage detecting circuit shown in the embodiments 2 and 3. Note that the ground is common to the control circuit 30 and the temperature detecting circuit 21, and both circuits are connected to each other in FIG. 15.

8. Embodiment 8

Figure 17:
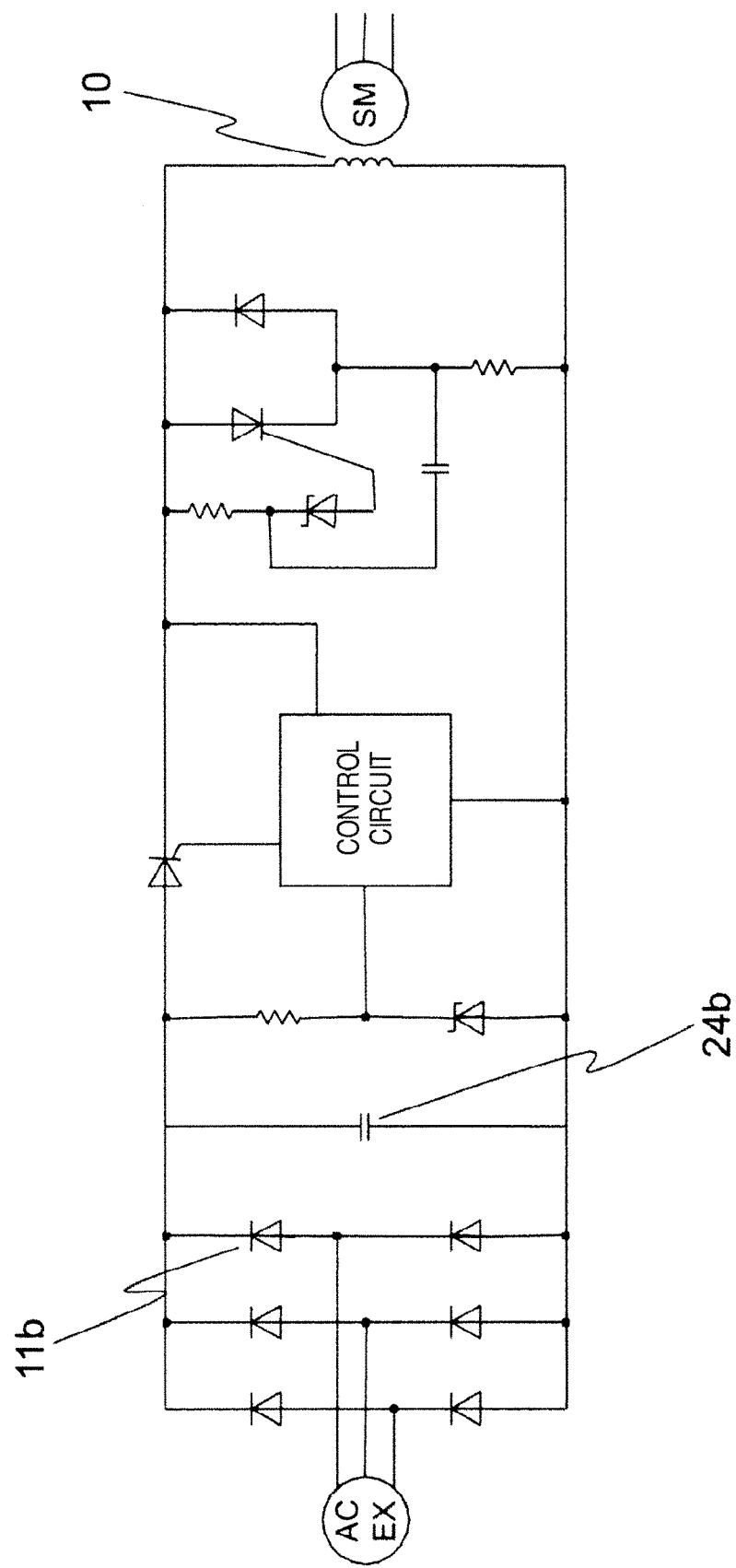
FIG. 17 is a circuit diagram when a smoothing capacitor 24b is disposed in a synchronously applying circuit of the field winding type synchronous machine 1.

FIG. 17 is a circuit diagram when a smoothing capacitor 24b is disposed in a synchronously applying circuit of the field winding type synchronous machine 1. As shown in FIG. 17, the smoothing capacitor 24b is disposed in parallel with and adjacent to the rectification circuit of the diode 11b. The current rectified by the rectification circuit includes a ripple component. Disposing the smoothing capacitor 24b can remove the ripple component and supply the field current without pulsation to the field coil 10. In this way, torque pulsation and an oscillation component of the electric motor caused from the ripple can be eliminated.

9. Embodiment 9

Figure 18:
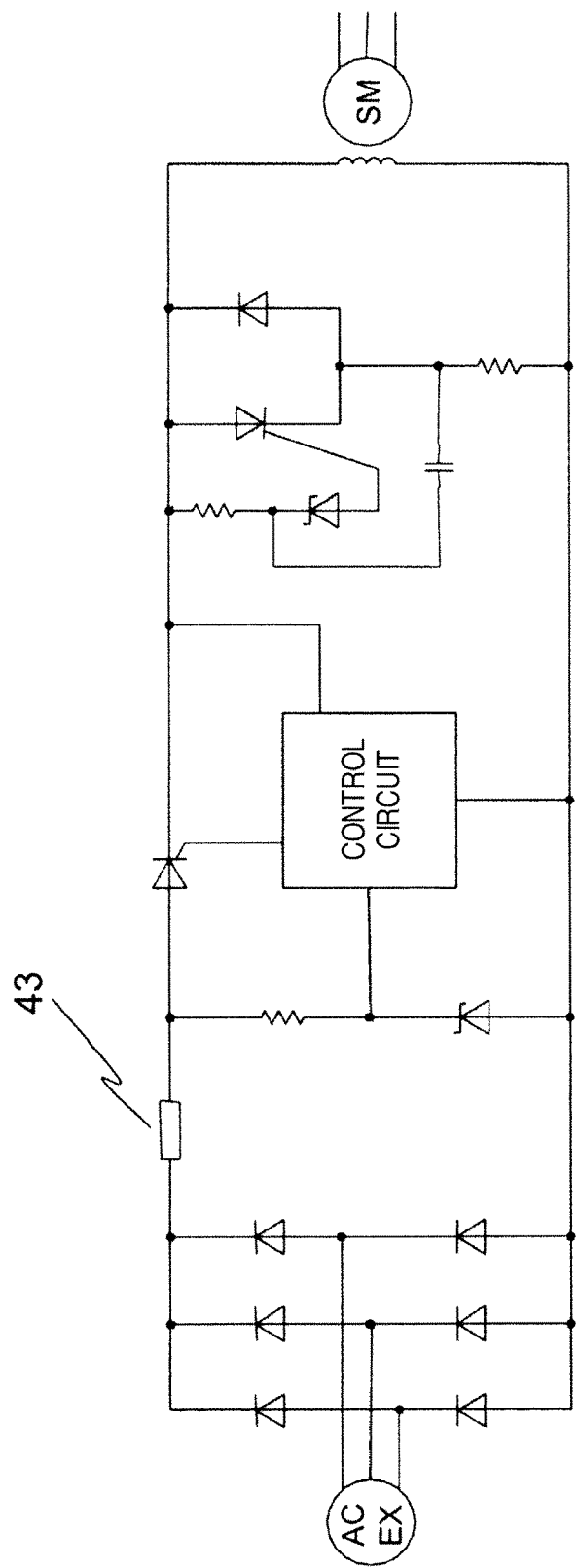
FIG. 18 is a circuit diagram when a ferrite core 43 is disposed in the synchronously applying circuit of the field winding type synchronous machine 1.

FIG. 18 is a circuit diagram when a ferrite core 43 is disposed in the synchronously applying circuit of the field winding type synchronous machine 1. As shown in FIG. 18, the ferrite core 43 is disposed in series to the field coil 10. This can remove a noise included in the direct voltage, so that a false operation of the circuit itself can be prevented.

10. Embodiment 10

Figure 19:
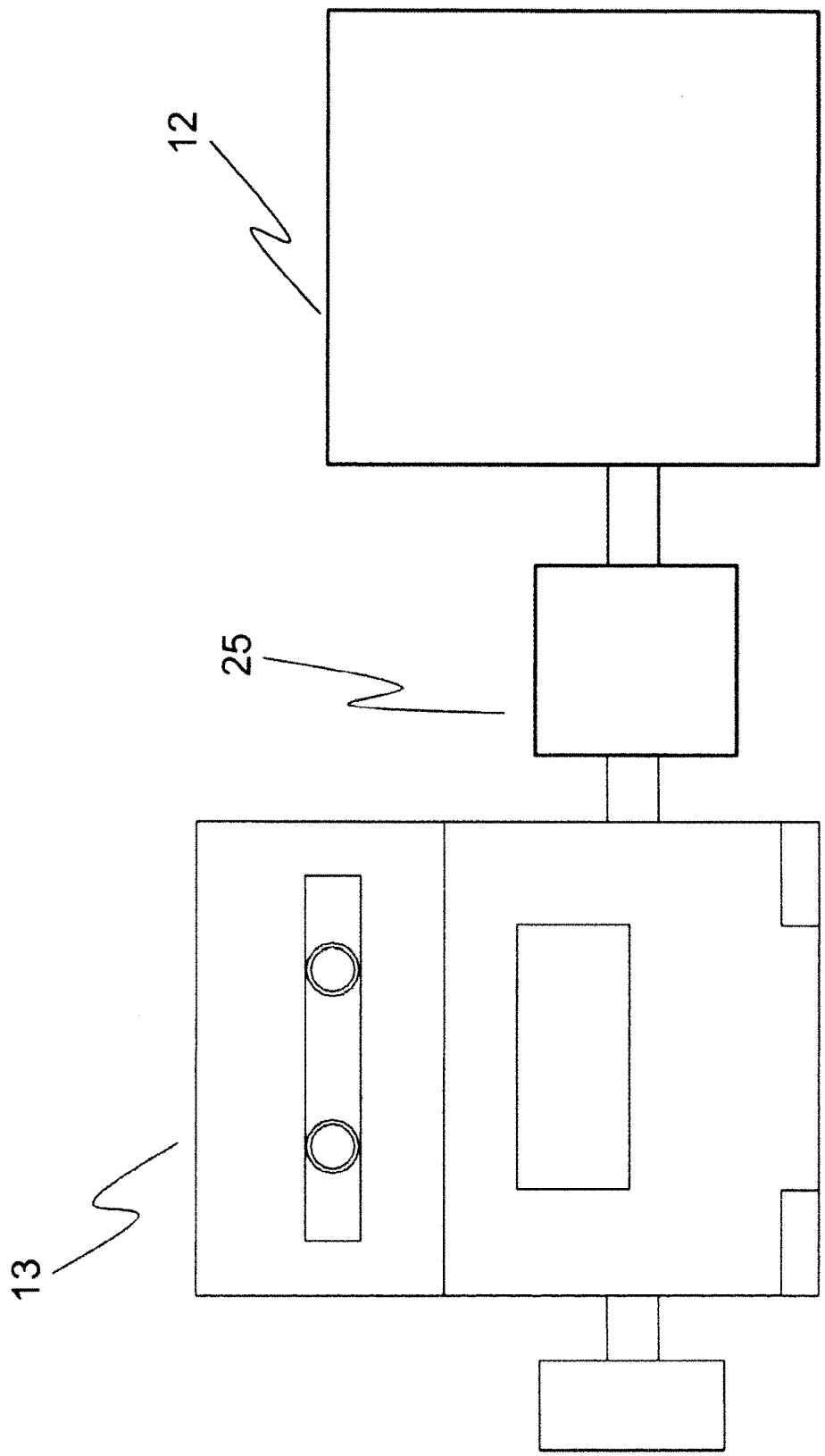
FIG. 19 shows an example where a compressor 12 is coupled to the field winding type synchronous machine 1.

FIG. 19 shows an example where a compressor 12 is coupled to the field winding type synchronous machine 1. A field winding type electric motor 13 including the circuits shown in the embodiments 1 to 7 is coupled to a speed increasing gear 25 and a compressor 12. This allows installation in plants which require a compressor, such as LNG, medicine and chemical plants, and operation of the field winding type electric motor.

It should be further understood by those skilled in the art that although the foregoing description has been made on embodiments of the inventive field winding type synchronous machine, the inventive field winding type synchronous machine is not limited thereto and various changes and modifications may be made without departing from the spirit of the inventive field winding type synchronous machine and the scope of the appended claims.

The invention claimed is:

1. A field winding type synchronous machine connecting to a DC line and including a rotor; a stator; an exciter that passes a current through a field winding of the rotor; and a rectification circuit that rectifies an output from the exciter and provides the output to the DC line, the field winding type synchronous machine comprising:
   the field winding being connected in parallel to a first circuit in which a parallel circuit including a rectifier element and a first switchgear is connected in series to a discharge resistor,
   a second switchgear being connected in series to the DC line that connects the first circuit to the rectification circuit, and
   a capacitor being provided between the discharge resistor and the input side of an electric power source element for gating the first switchgear,
   wherein a zero-crossing detecting device is connected in parallel between the rectification circuit and the field winding,
   an electric power source of the zero-crossing detecting device is provided, the electric power source being connected in parallel to the rectification circuit,
   a signal input part of the first switchgear is connected to the zero-crossing detecting device, and
   the first switchgear is gated according to a signal from the zero-crossing detecting device.

2. The field winding type synchronous machine according to claim 1,
   wherein a control circuit of the second switchgear is connected in parallel to the field winding.

3. The field winding type synchronous machine according to claim 1,
   wherein capacitance of the capacitor is determined as a function of a frequency of the direct current output from the exciter.

4. The field winding type synchronous machine according to claim 1,
   wherein a frequency detecting device is connected in parallel between the rectification circuit and the field winding,
   an electric power source of the frequency detecting device is provided, the electric power source being connected in parallel to the rectification circuit,
   a signal input part of the first switchgear is connected to the frequency detecting device, and
   the first switchgear is gated according to a signal from the frequency detecting device.

5. The field winding type synchronous machine according to claim 1,
   wherein a voltage detecting device is connected in parallel between the rectification circuit and the field winding,
   an electric power source of the voltage detecting device is provided, the electric power source being connected in parallel to the rectification circuit,
   a signal input part of the first switchgear is connected to the voltage detecting device, and
   the first switchgear is gated according to a signal from the voltage detecting device.

6. The field winding type synchronous machine according to claim 1,
   wherein a third switchgear is connected in series between the rectification circuit and the field winding,
   a temperature sensor is provided in the field winding,
   a temperature detecting device is connected in parallel between the rectification circuit and the field winding,
   an electric power source of the temperature detecting device is provided, the electric power source being connected in parallel to the rectification circuit,
   a signal input part of the third switchgear is connected to the temperature detecting device, and
   the third switchgear is gated according to a signal from the temperature detecting device.

7. The field winding type synchronous machine according to claim 1, wherein the discharge resistor is a variable resistor.

8. The field winding type synchronous machine according to claim 1,
   wherein a third switchgear is connected in series between the rectification circuit and the field winding,
   a current detecting device is connected in parallel between the rectification circuit and the field winding,
   an electric power source element for driving the current detecting device is provided,
   a current sensor is provided on a ground side of the electric power source element for driving, a signal input part of the third switchgear is connected to the current detecting device, and the third switchgear and a thyristor are gated according to a signal from the current detecting device.

9. The field winding type synchronous machine according to claim 1, wherein, in an LNG plant, the field winding type synchronous machine is coupled to a compressor via a speed increasing gear.

10. A field winding type synchronous machine connecting to a DC line and including a rotor; a stator; an exciter that passes a current through a field winding of the rotor; and a rectification circuit that rectifies an output from the exciter and provides the output to the DC line, the field winding type synchronous machine comprising:

the field winding being connected in parallel to a first circuit in which a parallel circuit including a diode and a first thyristor is connected in series to a discharge resistor, a second thyristor for disconnecting the discharge resistor when the field winding type synchronous machine is accelerated to about a rated revolution speed being provided in series to the DC line which connects the first circuit to the rectification circuit, a control circuit for gating the first thyristor and a zener diode for gating the second thyristor being connected in parallel between the field winding and the rectification circuit, and a capacitor being provided between the cathode side of the zener diode and the discharge resistor, wherein a zero-crossing detecting device is connected in parallel between the rectification circuit and the field winding, an electric power source of the zero-crossing detecting device is provided, the electric power source being connected in parallel to the rectification circuit, a signal input part of the first switchgear is connected to the zero-crossing detecting device, and the first switchgear is gated according to a signal from the zero-crossing detecting device.

* * * * *